United States Patent
Kim et al.

(10) Patent No.: US 9,314,744 B2
(45) Date of Patent: Apr. 19, 2016

(54) METHOD AND DEVICE FOR PRODUCING A MEMBRANE MODULE FOR A FUEL CELL AND MEMBRANE MODULES PRODUCED THEREBY

(75) Inventors: Hyun Yoo Kim, Gyeonggi-do (KR); Hyuck Roul Kwon, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 153 days.

(21) Appl. No.: 13/493,169

(22) Filed: Jun. 11, 2012

(65) Prior Publication Data

US 2013/0149634 A1 Jun. 13, 2013

(30) Foreign Application Priority Data

Dec. 9, 2011 (KR) .................. 10-2011-0131714

(51) Int. Cl.
| | |
|---|---|
| H01M 8/00 | (2006.01) |
| H01M 8/02 | (2006.01) |
| B29C 70/00 | (2006.01) |
| B29C 45/03 | (2006.01) |
| B01D 63/02 | (2006.01) |
| H01M 8/04 | (2006.01) |
| B01D 63/04 | (2006.01) |
| H01M 8/10 | (2006.01) |

(52) U.S. Cl.
CPC .............. *B01D 63/021* (2013.01); *B01D 63/04* (2013.01); *H01M 8/04149* (2013.01); *H01M 2008/1095* (2013.01); *Y02E 60/50* (2013.01); *Y02P 70/56* (2015.11)

(58) Field of Classification Search
CPC ........... H01M 8/00; H01M 8/02; H01M 8/04; H01M 8/22

USPC .................. 429/516, 535; 264/138; 425/542; 239/34
See application file for complete search history.

(56) References Cited

U.S. PATENT DOCUMENTS

| | | | |
|---|---|---|---|
| 2004/0094466 A1* | 5/2004 | Cheng et al. ............... | 210/321.8 |
| 2004/0178136 A1* | 9/2004 | Taniguchi et al. ........ | 210/321.79 |
| 2012/0111967 A1* | 5/2012 | Katagiri et al. ................. | 239/34 |

FOREIGN PATENT DOCUMENTS

| | | |
|---|---|---|
| JP | 2004-055534 A | 2/2004 |
| JP | 2004209418 A | 7/2004 |
| JP | 2007147139 A | 6/2007 |
| JP | 2007-216176 A | 8/2007 |
| KR | 10-2010-0100325 | 9/2010 |
| KR | 10-2011-0060048 | 6/2011 |
| KR | 10-2011-0109814 | 10/2011 |
| WO | 2011010636 A1 | 1/2011 |

OTHER PUBLICATIONS

Machine Translation of: JP 2007/216176 A, Aug. 30, 2007.*

* cited by examiner

*Primary Examiner* — Kenneth Douyette
(74) *Attorney, Agent, or Firm* — Mintz Levin Cohn Ferris Glovsky and Popeo, P.C.; Peter F. Corless

(57) ABSTRACT

Disclosed is a method and device for producing a membrane module used in a membrane humidifier for humidifying air in a polymer fuel cell, in which a small amount of hollow fiber membranes are disposed in the center of the membrane module and a larger amount of hollow fiber membranes are disposed toward the edge based on the design of a potting cap. Dry air introduced from an air blower into the membrane can be distributed to the edge where the larger amount of hollow fiber membranes are disposed, thereby maintaining uniform humidification performance over the entire hollow fiber membranes.

10 Claims, 10 Drawing Sheets

PRIOR ART

PRIOR ART

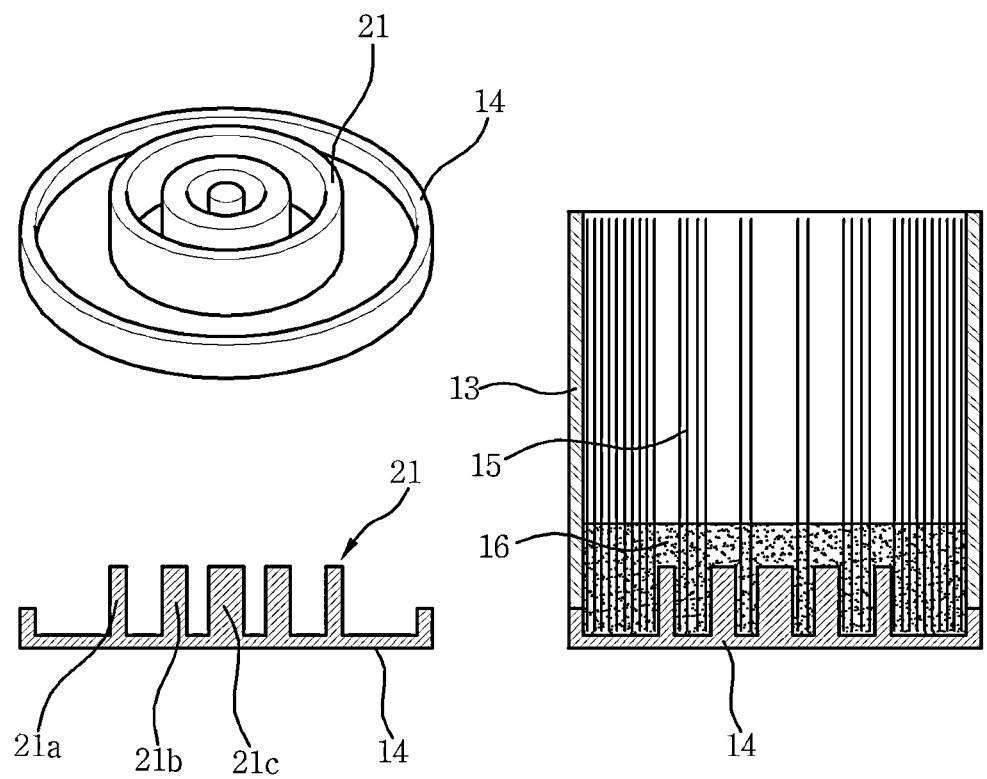
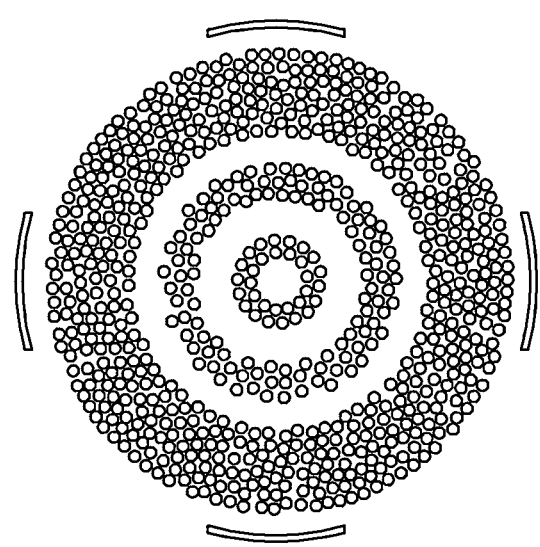
FIG. 8
FIG. 9

METHOD AND DEVICE FOR PRODUCING A MEMBRANE MODULE FOR A FUEL CELL AND MEMBRANE MODULES PRODUCED THEREBY

CROSS-REFERENCE TO RELATED APPLICATION

This application claims under 35 U.S.C. §119(a) the benefit of Korean Patent Application No. 10-2011-0131714 filed Dec. 9, 2011, the entire contents of which are incorporated herein by reference.

BACKGROUND (a) Technical Field

The present invention relates to a method and device for producing a membrane module for a fuel cell. More particularly, it relates to a method and device for producing a membrane module suitable for use in a membrane humidifier for humidifying air in a polymer fuel cell.

(b) Background Art

In general, operation of a polymer fuel cell requires water. Typically, a membrane humidifier that humidifies air supplied to the fuel cell is used for this purpose.

While there are various types of membrane humidifiers, such as a bubbler-type humidifier, an injection-type humidifier, an absorbent-type humidifier, etc., a membrane humidifier having a relatively small volume is used in a fuel cell vehicle due to some space limitations in the fuel cell vehicle. In addition to taking up little space, membrane humidifiers are particularly advantageous because they do not require special power.

As shown in FIG. 1, a membrane humidifier for a fuel cell generally comprises a membrane module 10, a housing 11, and a manifold 12.

Membranes are concentrated in the membrane module 10 and, for example, a plurality of bundles of hollow fiber membranes may be concentrated in the membrane module 10.

The membrane module is generally produced by the following processes.

As shown in FIG. 2, after a case 13 is produced, a potting cap 14 is covered on one side of the case 13, and a desired number of bundles of hollow fiber membranes 15 are put in the case.

Then, a polymer material 16 is injected into both ends of the case 13 to fix the plurality of bundles of hollow fiber membranes in the case 13.

This process is called a potting process.

In the potting process, a urethane material is mainly used as the polymer material.

The potting process uses gravity to fix the bundles of membranes 15 in such a manner that the polymer material 16, which is injected into the case through a resin hole, permeates through the membranes by gravity.

After the potting process, the polymer material is dried, and the potted portion is cut using a cutting device, thereby obtaining a desired membrane module.

Finally, when the housings 11 are put on both sides of the membrane module 10, the production of the membrane humidifier for the fuel cell is completed.

A typical prior art humidifier is one large module in which a plurality of bundles of hollow fiber membranes are received.

However, with such humidifiers, since the plurality of bundles of hollow fiber membranes are received in one large module, the hollow fiber membranes are not uniformly distributed but, rather, are concentrated on one side during the production of the module (see FIG. 3).

FIG. 4 is a schematic diagram showing the configuration of a typical membrane humidifier.

As shown in FIG. 4, the membrane humidifier has a housing 11 provided with a first inlet 17 for introducing dry air and a first outlet 18 for discharging the humidified air, and a membrane module 10 is disposed in the housing 11.

Moreover, a plurality of hollow fiber membranes 15 are received in the membrane module 10.

In the membrane humidifier using the hollow fiber membranes, wet air is supplied from a second inlet 19 and passes through the outside of each hollow fiber membrane 15. Then, the moisture in the wet air is separated by capillary action of the hollow fiber membrane 15, and the separated moisture passes through capillary tubes of the hollow fiber membrane 15 and is condensed. The moisture then moves to the inside of the hollow fiber membrane 15.

The wet air, from which the moisture is separated, moves to the outside of the hollow fiber membrane 15 and is then discharged through a second outlet 20.

Meanwhile, the dry air supplied from the first inlet 17 moves through the inside of the hollow fiber membrane 15.

The moisture separated from the wet air moves to the inside of the hollow fiber membrane 15 to humidify the dry air, and the humidified air is discharged to a fuel cell stack through the first outlet 18.

In the case of the prior art membrane humidifier, the wet air is introduced into the housing 11 through the second inlet 19 to supply moisture to the hollow fiber membranes 15, after which it is then discharged through the second outlet 20.

However, it is difficult for the wet air introduced through the second inlet 19 to penetrate the membrane module in which a plurality of hollow fiber membranes 15 are concentrated.

Moreover, with such membrane humidifiers, the wet air is diffused at a very low speed, which presents further difficulties.

For these reasons, the wet air passing through the outside of the membrane module 10 cannot penetrate the inside of the membrane module which is disposed in the housing 11, but instead mainly flows along the edge.

Further, with such membrane humidifiers, the wet air is diffused into the inside of the membrane module 10 at a very low speed, which significantly decreases the humidification efficiency.

Accordingly, the inside of the membrane module cannot receive sufficient moisture, and the overall efficiency of the membrane humidifier is reduced.

Moreover, in the case of the prior art membrane humidifier, most of the dry air introduced through the first inlet 17 mainly flows through the center of the membrane module 10, and thus the overall efficiency of the membrane humidifier is further reduced.

This is shown from a simulation result in FIG. 5.

Referring to FIG. 5, it can be clearly seen that most of the dry air introduced through the first inlet 17 flows only through the center of the membrane module.

That is, the dry air introduced through the first inlet 17 mainly flows through the center of the membrane module (as indicated by the flow running along the bottom of the Figure). Further, the wet air introduced through the second inlet 19 mainly flows along the edge of the membrane module. As a result, the efficiency of the membrane humidifier is significantly reduced.

The hollow fiber membrane, which is made of a polymer material, accounts for most of the production cost. However, since the prior art membrane humidifier has poor humidification efficiency as mentioned above, an excessive amount of bundles of hollow fiber membranes are used in order to improve humidification performance. As a result, the price of the membrane humidifier increases further. In addition, since a large amount of bundles of hollow fiber membranes are required to increase the humidification performance adequately, the size of the membrane humidifier likewise increases, which causes many difficulties in fitting the membrane humidifier within the limited space of the fuel cell vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method and device for producing a membrane module, particularly a membrane module used in a membrane humidifier of a polymer fuel cell. According to the present invention, a small amount of hollow fiber membranes are disposed in the center of the membrane module and a larger amount of hollow fiber membranes are disposed toward the edge. By changing the design of a potting cap such that dry air introduced from an air blower can be distributed to the edge of the membrane module, where a larger amount of hollow fiber membranes are disposed, uniform humidification performance over all of the hollow fiber membranes can be maintained.

In one aspect, the present invention provides a method for producing a membrane module for a fuel cell, the method comprising: producing a case; disposing a first potting cap on one side of the case; putting a plurality of bundles of hollow fiber membranes in the case; disposing a second potting cap on the other side of the case (the side through which the hollow fiber membranes are received); injecting a polymer material into the case to fix the plurality of bundles of hollow fiber membranes within the case, and drying the polymer material; and cutting the potted portion, in which the polymer material is injected and dried, using a cutting device. According to the present invention, at least one of the potting caps comprise a plurality of circular partitions having different diameters, protruding a predetermined height from the inner surface of the potting cap. The circular partitions are disposed concentrically and are spaced apart from each other at a predetermined interval. According to various embodiments, the partitions are spaced apart such that a first amount of hollow fiber membranes are disposed in the center portion of the membrane module and a second amount of hollow fiber membranes are disposed toward the edge of the membrane module, wherein the first amount is smaller than the second amount. For example, a "small" or "smaller" first amount of hollow fiber membranes may be disposed in the center portion of the membrane module, while a "large" or "larger" second amount may be disposed toward the edge of the membrane module, such as or similar to the relative amounts of hollow fiber membranes as depicted and arranged in the Figures. Further, the hollow fiber membranes are distributed throughout the center portion and throughout the portions disposed outwards towards the edge of the membrane module rather than being clumped together in only one or more areas of the portions. According to various embodiments, the hollow fiber membranes are disposed in the membrane modules based on the one or more circular partitions. In particular, the hollow fiber membranes are received in gaps between the one or more circular partitions such that the hollow fiber membranes can be provided in a desired arrangement within the case.

In an exemplary embodiment, the first potting cap is circular in overall shape, with an inner circular surface and an edge or rim-like structure protruding upwards from the inner surface and along the circumference thereof. A gap is disposed between an outermost partition and the edge of the potting cap, and one or more further gaps are provided between further partitions disposed concentrically within the outermost partition. The gap between the outermost partition and the edge may be larger than the one or more further gaps between the further partitions.

In another exemplary embodiment, the gaps between the partitions formed in the potting cap may be gradually reduced from the outermost partition to an innermost partition disposed toward the center.

In still another exemplary embodiment, the gaps between the partitions formed in the potting cap may be varied by varying the width of each partition. Thus, for example, while the center of the partitions may be uniformly spaced, the gaps between partitions can be varied by varying the width (or thickness) of partitions. Alternatively or in addition to varying the width of the partitions, the gaps can be varied by varying the spacing the partitions (based on the center of the partitions). Likewise, one or more gaps can be made the same by maintaining the spacing and widths of the desired partitions or by varying the spacing of the desired partitions while varying the widths to provide uniform gaps.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 8 is a schematic diagram showing another example of the potting cap used in the method for producing a membrane module for a fuel cell in accordance with the exemplary embodiment of the present invention;

FIG. 9 is a cross-sectional view showing the distribution of hollow fiber membranes in a membrane module produced by the method in accordance with the exemplary embodiment of the present invention;

Figure 1:
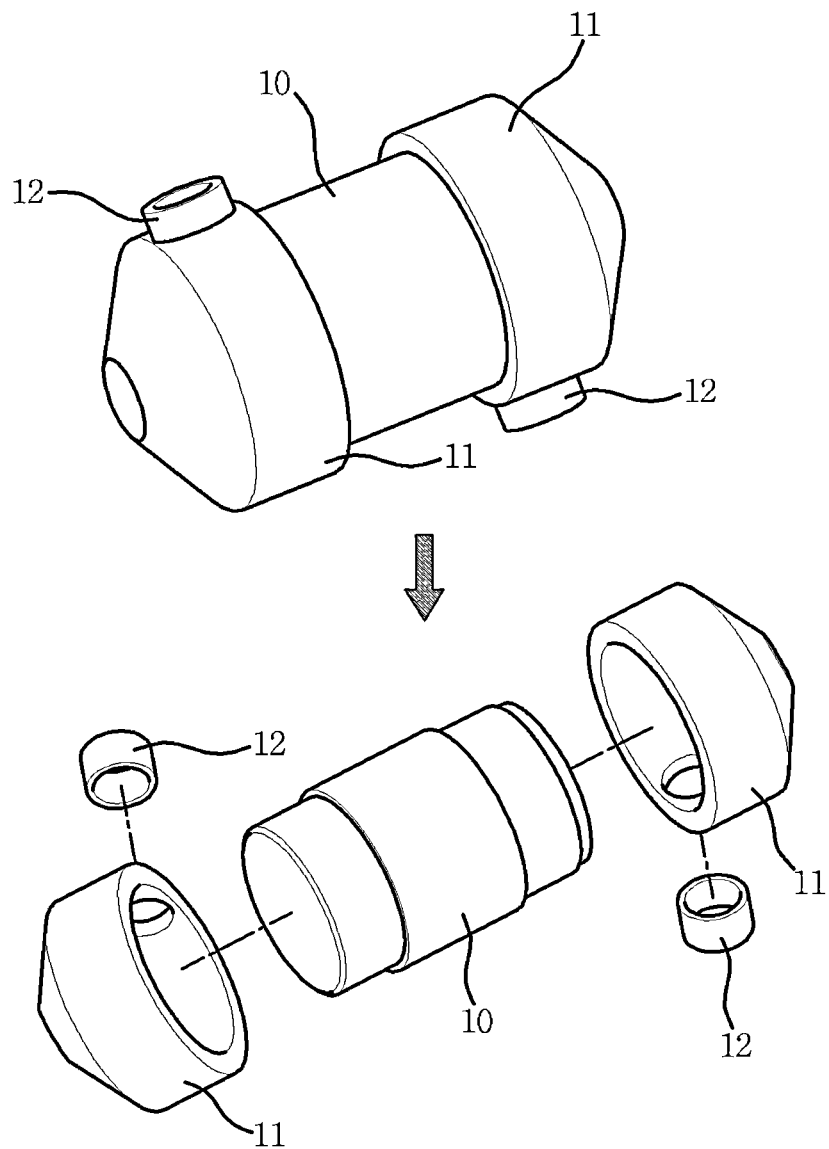
FIG. 1 is a perspective view showing a typical membrane humidifier for a fuel cell.
Figure 2:
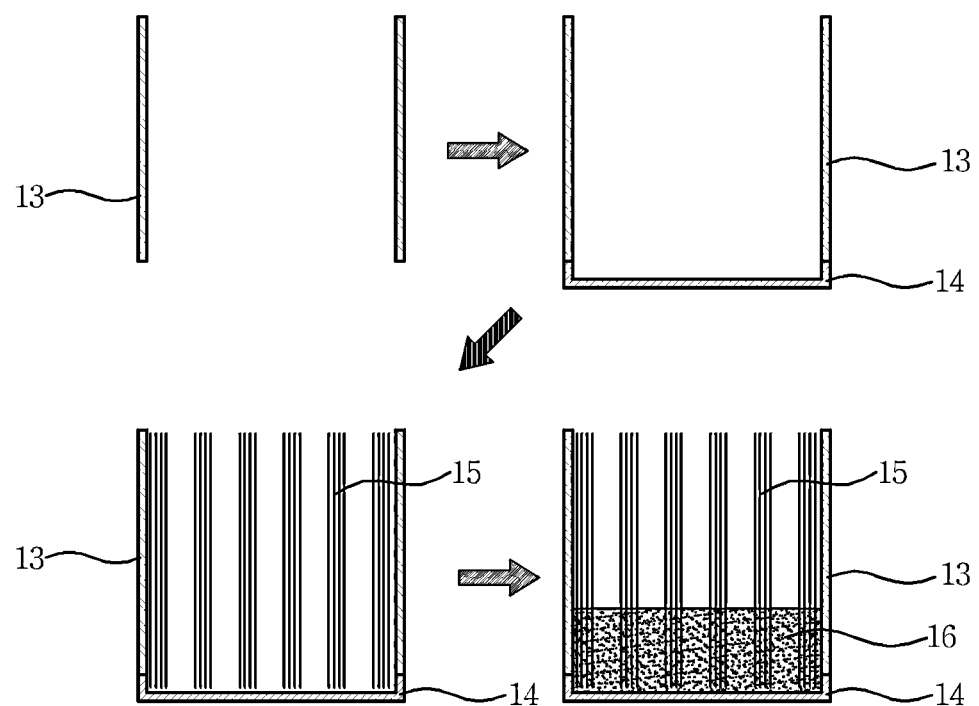
FIG. 2 is a schematic diagram showing a conventional method for producing a membrane module for a fuel cell.
Figure 3:
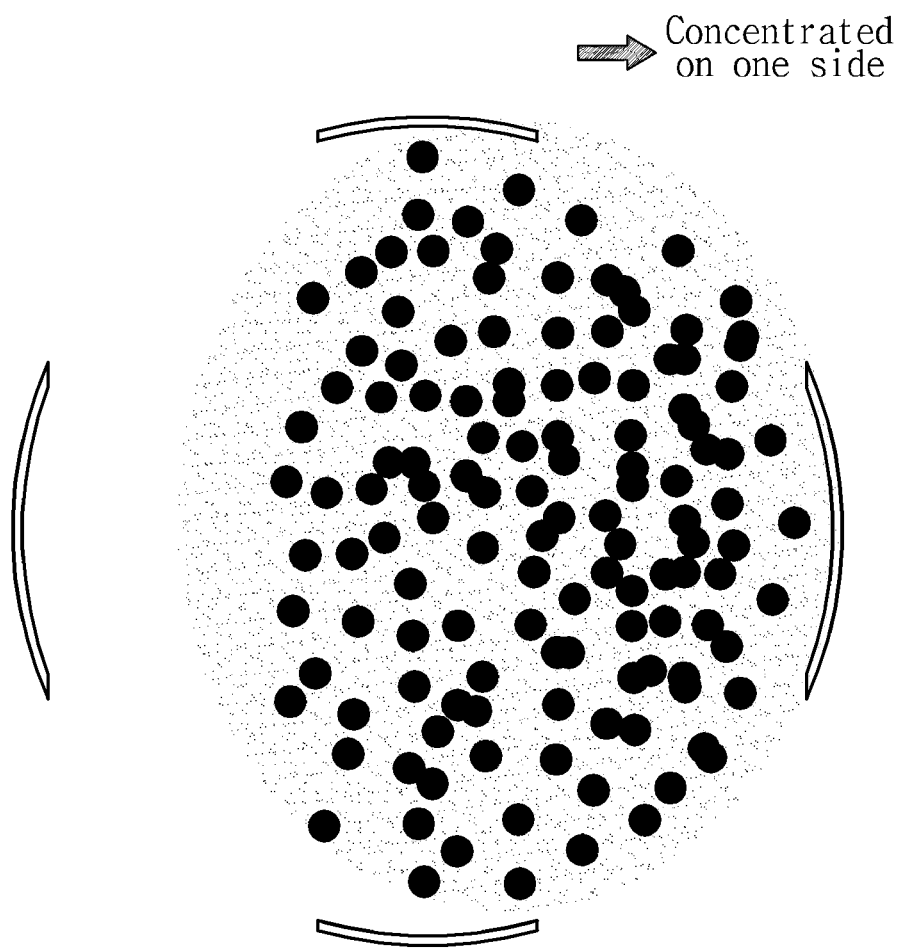
FIG. 3 is a cross-sectional view showing a phenomenon in which hollow fiber membranes are not uniformly distributed but, rather, are concentrated on one side during production of a conventional membrane module for a fuel cell.
Figure 4:
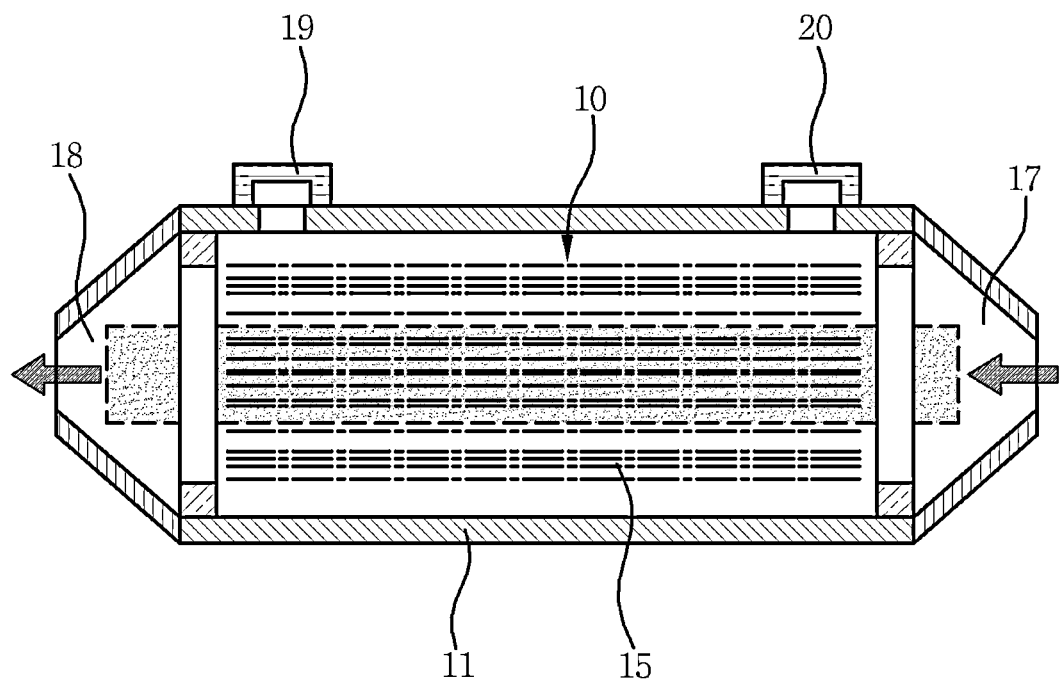
FIG. 4 is a cross-sectional view showing the internal structure of a conventional membrane module for a fuel cell.
Figure 5:
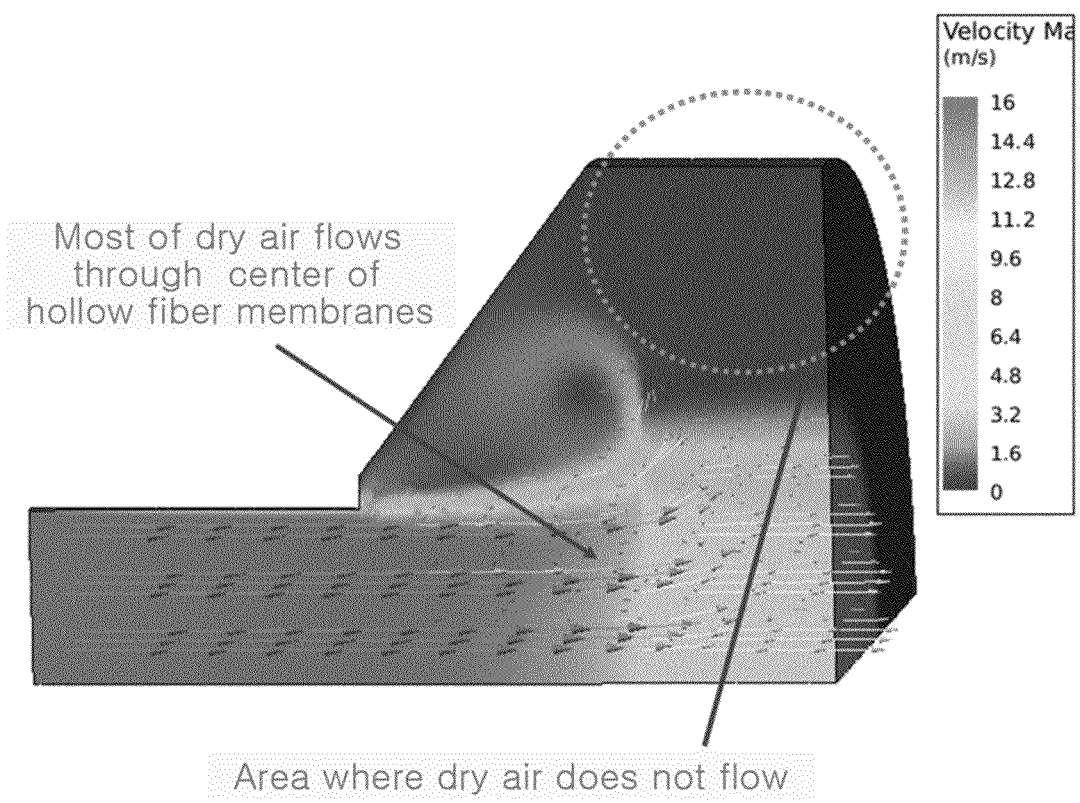
FIG. 5 is an image showing the simulation result of the flow of dry air in a conventional membrane module for a fuel cell.

Reference numerals set forth in the Drawings includes reference to the following elements as further discussed below:

| 10: membrane module | 11: housing |
| 12: manifold | 13: case |
| 14: potting cap | 15: hollow fiber membrane |
| 16: polymer material | 17: first inlet |
| 18: first outlet | 19: second inlet |
| 20: second outlet | 21: partition |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The present invention provides a method and device for producing a membrane module in which a first amount of hollow fiber membranes are disposed in the center portion of the membrane module and a second amount of hollow fiber membranes are disposed toward the outer portion of the membrane module. In particular, the present invention provides a method wherein the arrangement of hollow fiber membranes is adjusted and controlled by changing the design of a potting cap. According to embodiments of the present invention, the second amount of hollow fiber membranes is larger than the first amount.

According to embodiments of the present invention, dry air introduced from an air blower can be distributed to the outer edge portion of the membrane module where a larger amount of hollow fiber membranes are disposed.

Accordingly, it is possible to solve the conventional problem that the dry air flows only through the center of the membrane module. Rather, the present invention makes it possible to maintain uniform humidification performance over all of the hollow fiber membranes.

Figure 6:
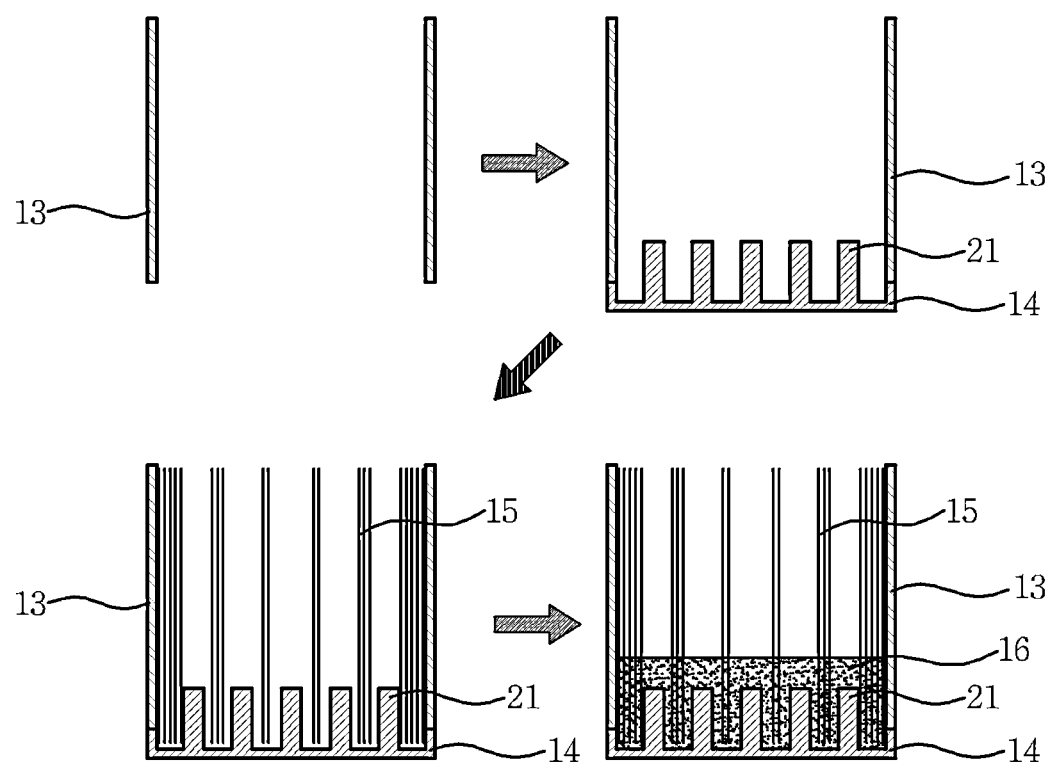
FIG. 6 is a schematic diagram showing a method for producing a membrane module for a fuel cell in accordance with an exemplary embodiment of the present invention.

FIG. 6 is a schematic diagram showing a device and method for producing a membrane module for a fuel cell in accordance with an exemplary embodiment of the present invention.

As shown in FIG. 6, first, after a case 13 is produced, a first potting cap 14 having a plurality of partitions 21 is disposed on one side of the case 13.

Then, a desired number of bundles of hollow fiber membranes 15 are put in the case 13.

Next, a second potting cap (not shown), which also preferably has a plurality of partitions matching those of the first cap 14, is disposed on the other side of the case 13.

Subsequently, a polymer material 16 is injected into the case 13, such as into one or both ends to fix the plurality of bundles of hollow fiber membranes 15 in the case 13. "Ends" refer generally to upper and lower locations along the height of the depicted cylindrical case 13, and thus, in some cases, the polymer material 16 can be injected into an upper and lower portion or "end" of the case 13 ("both ends"). The polymer material 16 is then dried according to any conventional technique known in the art.

Of course, the polymer material 16 may be injected through either an inlet of the potting caps or an inlet (not shown) on any one side of the case, or any plurality of sides, and in the same manner as an existing injection method.

When the polymer material 16 is completely dried, the potted portion in which the polymer material 16 is filled is cut using a cutting device, thereby completing the basic production process. The potted portion can be cut in any location as desired. In an exemplary embodiment, the potted portion is cut so that the cross sections of the hollow fiber membranes 15 are exposed by cutting the bottom of the potted portion close to the potting cap 14. Thus, for example, a cut-out portion to be discarded may include the bottom potting cap 14 and a small portion of the hollow fiber membranes 15 positioned close to the bottom part 14.

In particular, according to embodiments of the present invention, the hollow fiber membranes are disposed inside of the case 13 according to a desired configuration by providing the potting cap 14 with a plurality of partitions 21 each having a predetermined shape and distribution in the potting cap 14i.

Figure 7:
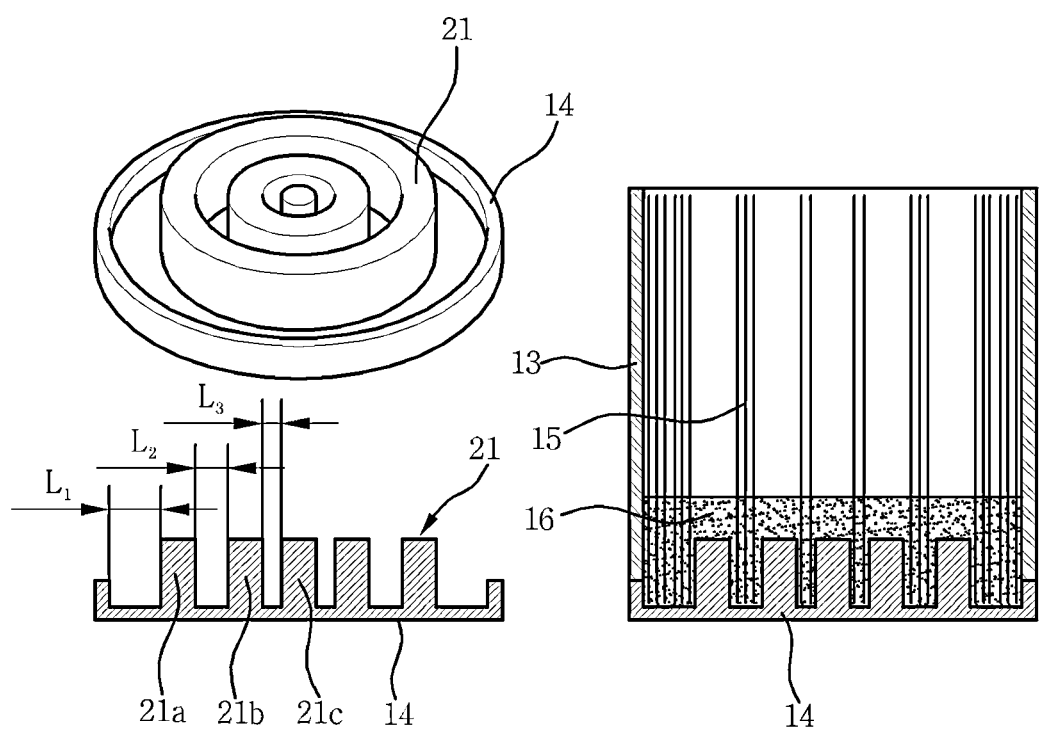
FIG. 7 is a schematic diagram showing an example of a potting cap used in the method for producing a membrane module for a fuel cell in accordance with the exemplary embodiment of the present invention.

To this end, as shown in the embodiment of FIG. 7, the plurality of partitions 21 formed inside of the potting cap 14 are disposed concentrically and have different diameters, protrude a predetermined height from the inner surface of the potting cap 14, and are disposed concentrically at predetermined intervals.

Accordingly, the hollow fiber membranes 15 inserted into the case 13 are disposed in the gaps between the partitions 21 such that the numbers of the hollow fiber membranes 15 disposed in the module can be controlled and can be distinct from each other based on the gaps between the partitions 21. For example, a small amount of hollow fiber membranes 15 can be disposed in the center portion of the module, while a larger amount of hollow fiber membranes 15 can be disposed toward the edge portion of the module by providing a larger gap (which, thus, accommodates more hollow fiber membranes 15) at the outer edge portion, and a smaller gap (which, thus, accommodates fewer hollow fiber membranes 15) at the center portion. As shown, the hollow fiber membranes 15 are disposed within the gaps formed by the partitions 21. As further shown (e.g., see FIG. 8 and the resulting arrangement shown in FIG. 9), the hollow fiber membranes 15 are disposed within the gaps so as to be distributed evenly throughout the gaps rather than being provided and clumped in only one or more sections of the gaps.

Moreover, the locations of the partitions 21 define a plurality of parallel spaces between the hollow fiber membranes 15 in the module along the axial direction of the module.

According to the exemplary embodiment shown in FIG. 7, the gap between the partitions 21 formed in the potting cap 14 can be gradually reduced from the partition 21a disposed at the outermost side to the partitions 21b and 21c disposed toward the center ($L_1 > L_2 > L_3$).

For example, the gap ($L_1$) between the partition 21a disposed at the outermost side and the edge of the potting cap is larger than the gaps ($L_2$ and $L_3$) between the partitions 21b and 21c disposed inside of the outermost partition 21a such that a smaller amount of hollow fiber membranes 15 can be disposed in the center portion of the module and a larger amount of hollow fiber membranes 15 can be disposed toward the outer edge portion.

Accordingly, dry air can be distributed to the outer edge portion of the module where a larger amount of hollow fiber membranes 15 are disposed and, thus, the dry air can become humidified to a greater degree by the hollow fiber membranes 15 at the outer edge portion where a larger amount of water is condensed (as compared to the center of the module), thereby ensuring uniform humidification performance over all of the hollow fiber membranes.

According to various embodiments, the gaps between the partitions 21 formed in the potting cap 14 may be varied by varying the width (i.e., thickness) of each partition 21.

In particular, as shown in FIG. 8, the width of the outermost partition 21a which is disposed near the edge of the potting cap 14 can be smaller than the widths of the partitions 21b and 21c disposed toward the center, thus providing a gap between the outermost partition 21a and the edge of the potting cap 14 that is larger than the gaps ($L_2$ and $L_3$) between the partitions 21b and 21c disposed inwardly (i.e., toward the center). As a result, a small amount of hollow fiber membrane 15 can be disposed in the center portion of the module and a larger amount of hollow fiber membranes 15 can be disposed toward the outer edge portion.

Figure 11:
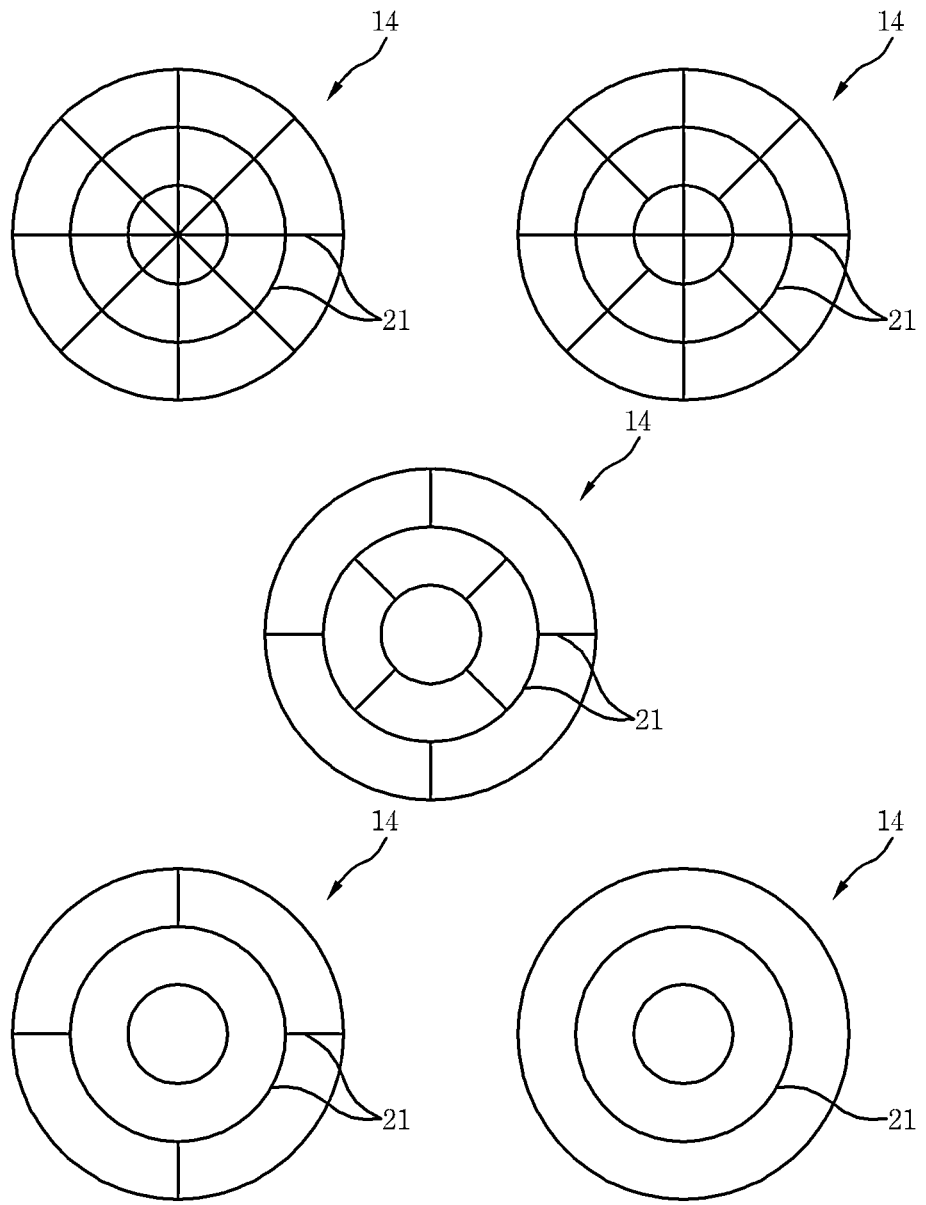
FIG. 11 is a schematic diagram showing various shapes of the potting cap used in the method for producing a membrane module for a fuel cell in accordance with the exemplary embodiment of the present invention.

The partitions 21 of the potting cap 14 (as well as the other potting cap if partitions are provided) may have various shapes. For example, as shown in FIG. 11, the partitions 21 may have various shapes formed by combinations of a plurality of circular partitions and radially-extending linear partitions.

As such, in the case of the typical membrane humidifier, which is one large module in which the plurality of bundles of hollow fiber membranes are received, the hollow fiber membranes are not uniformly distributed but are instead concentrated on one side during production of the membrane module.

However, according to the method and device of the present invention, the plurality of hollow fiber membranes 15 are received in the membrane module 10 in a divided manner based on the arrangement of the partitions 21, and thus it is possible to solve the conventional problem that the hollow fiber membranes are concentrated on one side (see FIG. 9).

Figure 10:
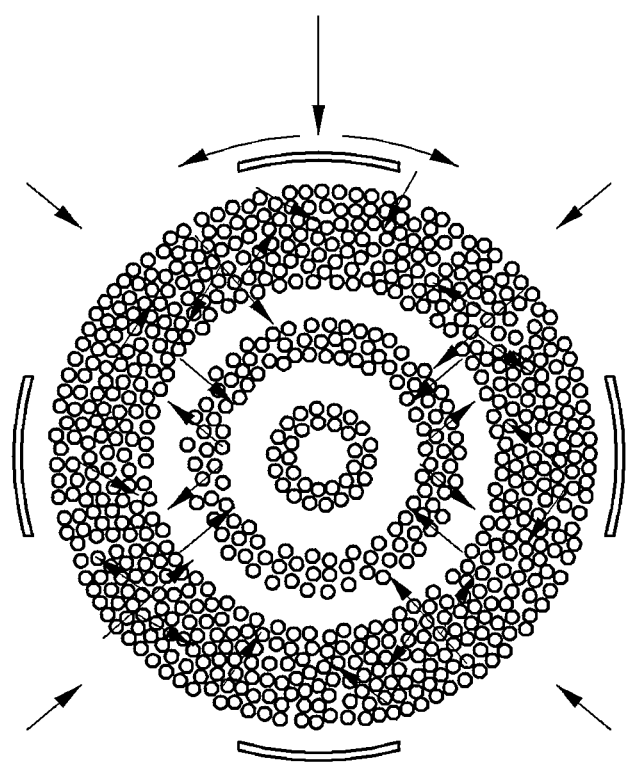
FIG. 10 is a cross-sectional view comparing the membrane module produced by the method in accordance with the exemplary embodiment of the present invention and a membrane module produced by a conventional method.

Moreover, according to the method and device of the present invention, the distribution of wet air and dry air can be improved, and thus it is possible to improve the utilization of the membrane (see FIG. 10).

Furthermore, with conventional membrane humidifiers, the hollow fiber membranes on the outer edges of the membrane module are broken due to their non-uniform distribution and uneven distribution of wet air at the outer edges. The device and method of the present invention provide for improved distribution of hollow fiber membranes within the membrane module and improved distribution of wet air, thus solving the problem of hollow fiber membrane breakage.

In addition, according to the method and device of the present invention, the performance of the humidifier can be improved, and thus it is possible to reduce the amount of hollow fiber membranes used compared to the existing membrane humidifier while still maintaining humidification efficiency.

As described above, the method and device for producing a membrane module for a fuel cell according to the present invention has the following advantages.

First, since a first amount (in particular, a small amount) of hollow fiber membranes are disposed in the center portion of the module and a second amount (in particular, larger amount than the first amount) of hollow fiber membranes are disposed toward the outer edge portion, it is possible to prevent the dry air from flowing only through the center of the membrane module, and thus it is possible to maintain uniform humidification performance throughout the hollow fiber membranes.

Second, since the plurality of hollow fiber membranes are received in the membrane module in a divided manner (e.g., divided by partitions), it is possible to solve the conventional problem that the hollow fiber membranes are concentrated on one side. If is further possible to solve the conventional problem that the hollow fiber membranes on the edge are broken due to the non-uniform distribution.

Third, with the improved performance of the membrane humidifier of the present invention, it is possible to reduce the amount of hollow fiber membranes used while still maintaining humidification efficiency, and thus it is possible to reduce the production cost and size of the membrane humidifier.

Further, it is possible to reduce the pressure drop applied to the membrane humidifier by distributing the hollow fiber membranes within the membrane module, and thus it is possible to reduce the load applied to the air blower.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for producing a membrane module for a fuel cell, the method comprising:
producing a case having outer walls, a top side and a bottom side;
disposing a first potting cap on the bottom side of the case, the first potting cap comprising an inner surface and a plurality of circular partitions protruding a predetermined height from the inner surface of the potting cap, the plurality of partitions having different diameters and being concentrically disposed and spaced apart at predetermined intervals;
placing a plurality of bundles of hollow fiber membranes in the case through the top side, wherein the hollow fiber membranes are divided by the plurality of partitions each of which has thickness larger than diameter of each hollow fiber membrane such that a first amount of hollow fiber membranes are disposed in a center portion of the case and a second amount of hollow fiber membranes are disposed toward an outer portion of the case, wherein the second amount is larger than the first amount;

disposing a second potting cap on the top side of the case;

injecting a polymer material into the case to fix the plurality of bundles of hollow fiber membranes;

drying the polymer material to thereby form a potted portion; and cutting the potted portion, wherein a plurality of gaps are formed between the plurality of partitions in a radial direction, wherein the gap between the partitions formed in the potting cap is reduced from the partition disposed at the outermost side to the partitions disposed toward the center such that a smaller amount of hollow fiber membranes is disposed in the center portion of the module and a larger amount of hollow fiber membranes is disposed toward the outer edge portion to maintain humidification performance throughout the whole membrane module.

2. The method of claim 1, wherein the plurality of gaps reduce in size from an outermost gap to an innermost gap.

3. The method of claim 1, wherein a plurality of gaps are formed between the plurality of partitions, and wherein the plurality of gaps are varied in size by varying the widths of the plurality of partitions.

4. The method of claim 1, wherein the plurality of gaps are varied in size by varying the widths of the plurality of partitions.

5. The method of claim 1, wherein the plurality of gaps are varied in size by varying the widths of the plurality of partitions.

6. A membrane module formed by the method of claim 1.

7. A fuel cell comprising the membrane module of claim 6.

8. A device for producing a membrane module for a fuel cell by a potting method comprising:

a case having outer walls, a top side and a bottom side, a plurality of bundles of hollow fiber membranes being placed in the case through the top side;

a first potting cap disposable on the bottom side of the case, the first potting cap comprising an inner surface and a plurality of circular partitions protruding a predetermined height from the inner surface of the potting cap, the plurality of partitions having different diameters and being concentrically disposed and spaced apart at predetermined intervals, each of which has thickness larger than diameter of each hollow fiber membrane;

a second potting cap disposable on the top side of the case;

one or more injection inlets for injecting a polymer material into the case, wherein a plurality of gaps are formed between the plurality of partitions in a radial direction, wherein the gap between the partitions formed in the potting cap is reduced from the partition disposed at the outermost side to the partitions disposed toward the center such that a smaller amount of hollow fiber membranes is disposed in the center portion of the module and a larger amount of hollow fiber membranes is disposed toward the outer edge portion to maintain humidification performance throughout the whole membrane module.

9. The device of claim 8, wherein the plurality of gaps reduce in size from an outermost gap to an innermost gap.

10. The device of claim 8, wherein a plurality of gaps are formed between the plurality of partitions, and wherein the plurality of gaps are varied in size by varying the widths of the plurality of partitions.

* * * * *